United States Patent [19]
Kiriazaros

[11] 4,234,237
[45] Nov. 18, 1980

[54] BEARING FOR HEAVY STEEL DRUMS, IN PARTICULAR DECORTICATING DRUMS

[75] Inventor: Kiriazis Kiriazaros, Graz, Austria

[73] Assignee: Maschinenfabrik Andritz Aktiengesellschaft, Austria

[21] Appl. No.: 782,559

[22] Filed: Mar. 29, 1977

[51] Int. Cl.³ ............................................. F16C 27/00
[52] U.S. Cl. .................................... 308/26; 144/208 B; 241/178; 308/203
[58] Field of Search ............ 308/20, 26, 73, 202, 308/203, 204, 205, 238; 267/152, 141, 57.1 R, 57.1 A, 63 R; 19/5 R, 5 A, 24; 248/130; 259/3, 81 R, 89; 241/178; 144/208 B; 214/340; 366/63, 233

[56] References Cited

U.S. PATENT DOCUMENTS

| | | | |
|---|---|---|---|
| 2,908,179 | 10/1959 | Taylor | 308/203 |
| 3,022,128 | 2/1962 | Reuter | 308/238 |
| 3,279,779 | 10/1966 | Thomas et al. | 267/63 R |
| 3,601,459 | 8/1971 | Cutting | 308/238 |
| 3,783,918 | 1/1974 | Simpson et al. | 144/208 B |
| 3,975,007 | 8/1976 | Chorkey | 267/152 |

FOREIGN PATENT DOCUMENTS

| | | | |
|---|---|---|---|
| 84853 | 11/1935 | Sweden | 144/208 B |
| 592043 | 9/1947 | United Kingdom | 308/203 |

*Primary Examiner*—Charles E. Frankfort
*Attorney, Agent, or Firm*—James E. Bryan

[57] ABSTRACT

This invention relates to an improvement in a shock-proof bearing for a heavy drum which is rotatably supported on roller and is adapted to be driven by a gear drive, the axial spacing between the drum and the roller or the gear drive remaining constant for every spring-support position, the improvement comprising that the roller and a driving pinion are integral, and spring support elements mounted between a casing of the roller and a hub thereof.

2 Claims, 6 Drawing Figures

BEARING FOR HEAVY STEEL DRUMS, IN PARTICULAR DECORTICATING DRUMS

The invention relates to a shock-proof bearing for heavy steel drums, in particular decorticating drums rotatably supported on rollers and rotating by means of gear drives at low rpms, the axial distance between the steel drum and the roller gear drive remaining constant for every spring-held position.

It is known to place a heavy steel drum on bearing blocks which in turn are equipped with a pair of rollers directed upwardly and of such axial spacing that the drum lies in between in a slightly movable manner. When dealing for instance with decorticating equipment, this system permits to impart easily a relative rotation to the steel drum, so as to obtain decortication. A mechanical drive is used, consisting as a rule of a gear drive, however systems making use of frictional rollers or chain drives are equally well known. The rollers most often are cast or made of welded steel plates and rotatably mounted on the roller block by means of ball bearings. The roller block rests on the foundation. The load from the drum thus passes through the rollers to the bearing block to the foundation.

This kind of equipment has the disadvantage that the goods being processed fall against the lower side of the interior wall in operation, and shocks are transmitted to the rollers. Consequently the surfaces of the rollers are damaged within a short time and the service life of the rollers is severely restricted.

As a result, the rollers have been designed in the manner of automobile wheels in order to afford better compensation against the imbalance forces. Such rollers however have the drawback that their wear is very high, so that a tire change is required within a short time. It is true that the hard impacts on the rollers are absorbed by the rubber tires, but the service life thereof is much shortened. A further suggested step is a conventional spring-support of the rollers, again for the purpose of absorbing the heavy shocks on the drum.

As initially noted, the steel drums must be started in rotation by means of a mechanical drive, and the best system of that type is a gear drive. This drive however requires a constant axial spacing between the drum and the pinion in order to keep the teeth steadily meshed. Therefore the so-called spring support for the rollers cannot be used, or is used only if a chain drive is employed. However a chain drive also is subject to great wear; this kind of drive also must be omitted.

U.S. Pat. No. 1,700,390, discloses a drum equipped with a roller bearing with rigid rollers, the bearing resting on races, and a separate gear drive mounted on a special bearing block. This design has the drawback that a change in the axial spacing or in another position of the drum is impossible and hence shock attenuation cannot be effected. If such nevertheless were provided, high wear of the bevel gear or of the spur gear would be expected.

The present invention addresses the problem of providing a shock-proof bearing for a heavy steel drum rotatably resting on rollers, the axial spacing between the steel drum and the rollers or gear drive remaining constant for every spring support position.

The object of the invention is achieved by the rollers and the drive pinion being made integral and by mounting a wheel-hub spring, which may be a rubber insert, between the rollers and the hub. This construction allows the steel drum to rotate with great imbalance and to simply absorb the impacts when there is an impulse-like change of position of the goods, without the bevel gears changing their constancy upon this change in position.

The invention will be further illustrated by reference to the accompanying drawings, in which.

Figure 1:
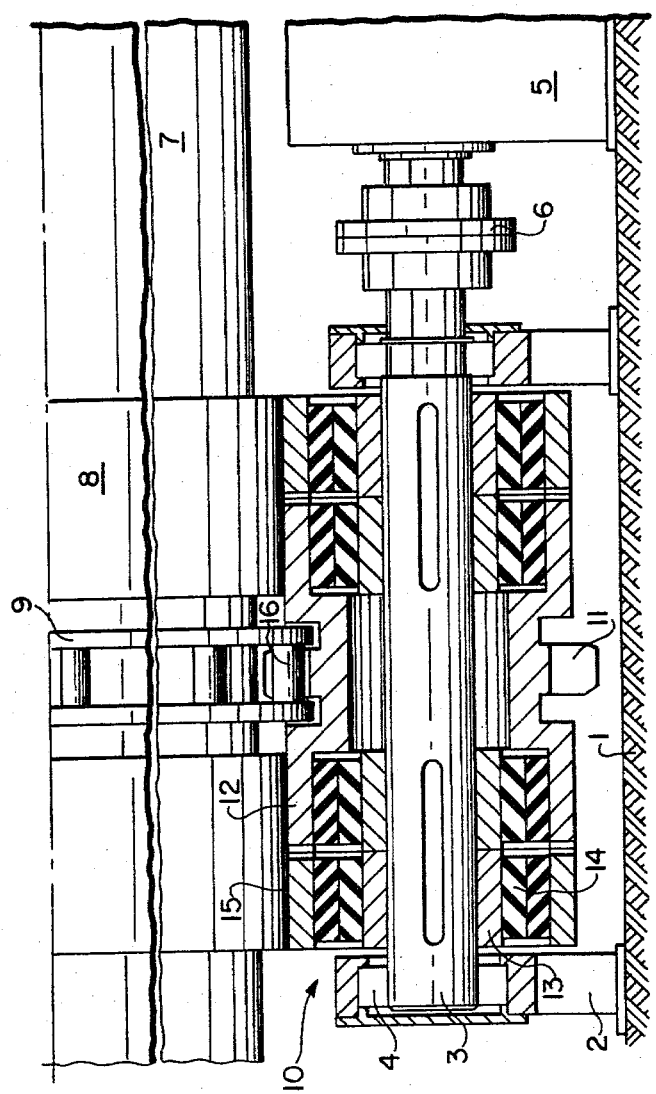
FIG. 1 is a longitudinal section through a pair of rollers.

FIG. 1 shows a longitudinal section of the shock-proof bearing system of the steel drum or rollers with bevel gears. A bearing block 2 is mounted on both sides of the foundation 1 and supports a bearing shaft 3 by means of ball bearings 4. A roller 10 is mounted on the bearing shaft 3, the details of the roller being described below. A drive motor 5 also is mounted on the foundation 1; it drives the bearing shaft 3 by means of a coupling 6. A steel drum 7 is equipped with the races 8 at the area of contact with the rollers 10. The race 8 is in the form of a double ring and at the center houses the gear 9. The drive pinion 11 meshes with the gear 9, the type of teeth being immaterial. The embodiment shows a mangle gear, which is best suited for this purpose.

The roller 10 is composed of a hub 13 mounted on the bearing shaft 3 by means of an adjusting spring. The roller casing 12 is mounted above the hub 13 in order to form a cavity containing a rubber insert 14 constituting the spring support for the wheel hub. The roller casing 12 has a smooth exterior surface and extends across two pairs of hubs mounted a certain distance apart. The drive pinion 11 is provided in a clearance at the center of this distance. The sector of a circle 16 of the drive pinion 11 and the diameter of the roller casing 12 precisely coincide.

If now the roller 10 is loaded, the rubber insert 14 is compressed in that region which is closest to the drum. Because the drive pinion 11 is made integral with the roller casing 12, the latter also is forced away from the shaft center. This displacement may be considered to be the spring support. However, the axial distances between the crown of the gear 9 and the drive pinion 11 remain the same, so that tooth meshing remains intact.

Figure 2:
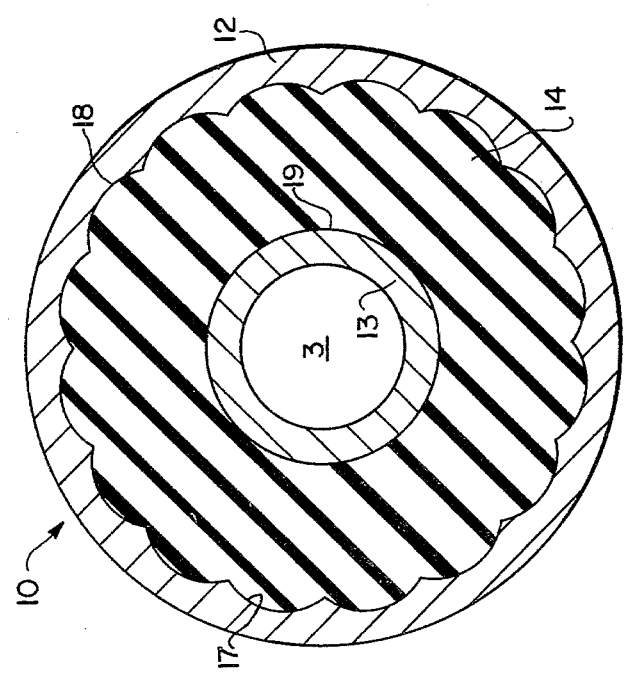
FIG. 2 is a design of the wheel-hub spring support in the form of a rubber insert.

FIG. 2 shows the design of such a roller 10 in cross-section, the hub 13 being seated on a bearing shaft 3 and having a smooth surface at the external surface 19 thereof. The roller casing 12, on the contrary, is provided with the arcuate recesses 18 on the inner side 17thereof, a rubber insert 14 being located in this space between the inner side 17 of the roller casing 18 and the exterior 19 of the hub 13. The roller 10 therefore is designed to be a hub spring support, the rubber insert 14 being solidly connected to the steel parts. To achieve a progressive spring effect, various compound rubber layers may be employed as the insert, for instance a hard one at the side of the hub 13 and a soft one at the inside 17. This is illustrated for instance in FIG. 1 by variously dense hatchings.

Figure 3:
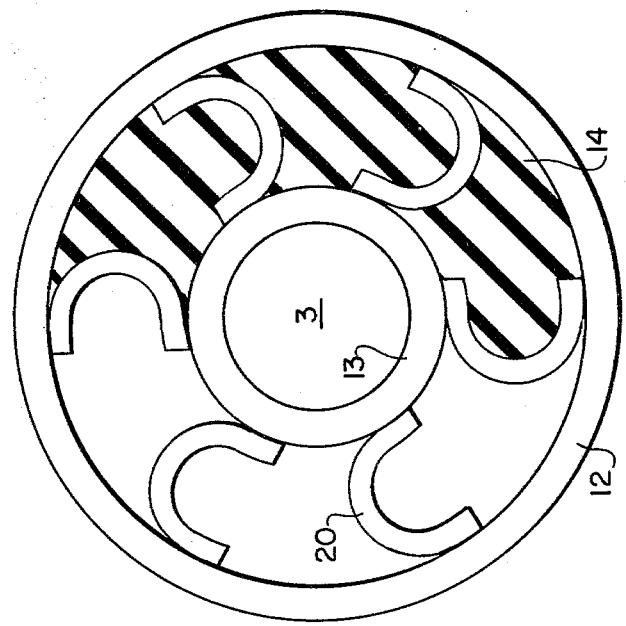
FIG. 3 is a roller with spring inserts.

FIG. 3 shows a further embodiment of the roller 10, with the spring elements 20 being inserted in the space between the hub 13 and the roller casing 12, the elements being composed of arcuate leaves of spring steel and fastened by means of screws or rivets. It is possible to solely insert these spring elements 20, or else to additionally provide the cavities with a rubber insert 14.

Figure 4:
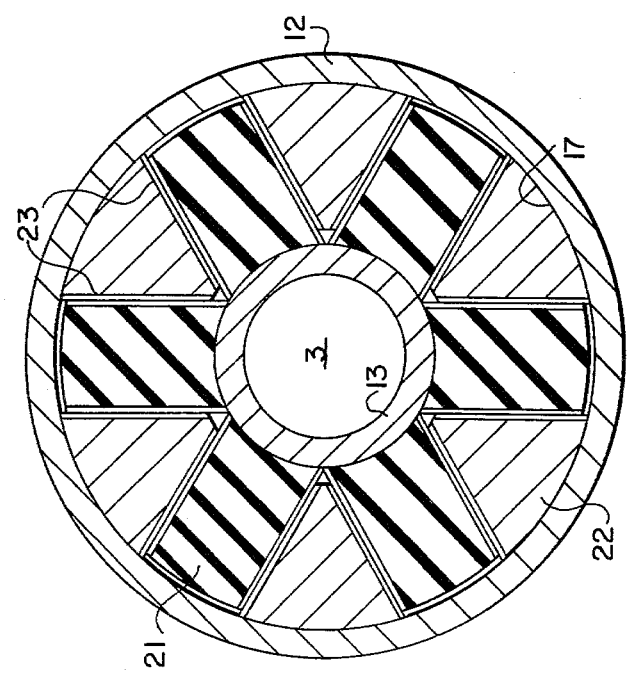

FIG. 4 shows another variant, in which rubber inserts 21 are mounted in an approximately star-shaped manner at equal spacings on the hub 13, these radial rubber inserts being provided with a sheet metal casing. The support components 22 of approximately triangular cross-sectional configuration are mounted in the cavities of these individual rubber inserts to the inside 17 of the roller casing 12, the components in turn being equipped with a casing at their exterior. These latter casings however are of such dimensions as to form a surface 23 which may be easily shifted with respect to the other sheet metal casings, so that a wheel hub spring support is thereby created.

Designing the rollers as wheel hub spring supports and simultaneously the roller casing and the drive pinion integrally ensures that the spring support system always can respond and simultaneously the drive pinion may be moved along with the bearing shaft, the axial spacing being maintained constant in all cases.

Figure 5:
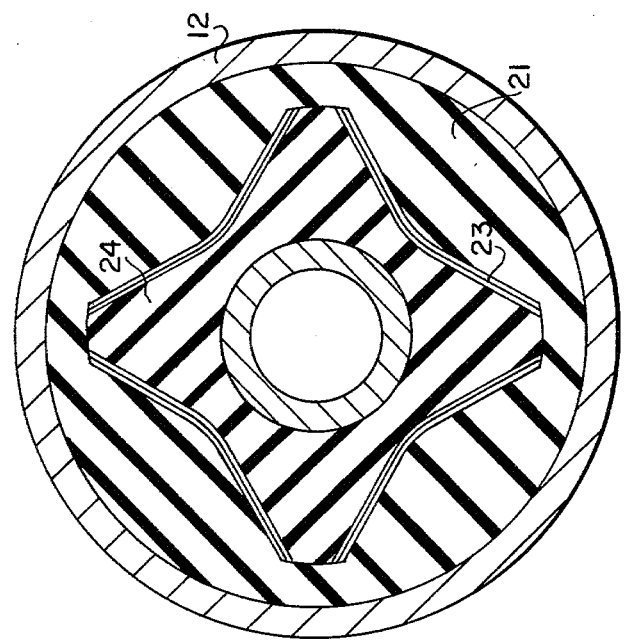
FIGS. 4 and 5 show a roller with a casing of rubber.

The construction of the roller 10 in FIG. 5 was found to be particularly advantageous. In this case, a wedge-shaped segment rubber 24 is vulcanized onto the hub 13 at 90° intervals, the segment tapering toward the outside and being surrounded by a steel sheath, a rubber insert 21, filling the cavity, being mounted so as to act as a support element from the roller casing 12. These two rubber inserts are not vulcanized together, rather they are maintained mechanically separate by the surfaces 23, whereby the possibility of gliding displacement is achieved.

Figure 6:
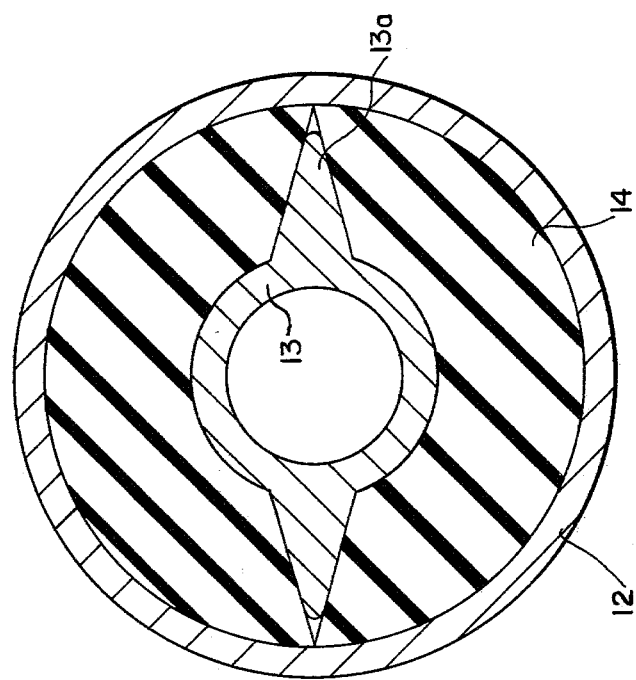
FIG. 6 is a roller for high moment of inertia transmission.

FIG. 6 shows a design in which the hub 13 is provided with radial extensions 13a, a rubber insert 14 again being placed into the cavity between the roller 12 and the hub 13. The purpose of this arrangement is better transmission of very large torques in the case of heavy steel drums from the motor 5 through the bearing shaft 3 to the roller 10 or the drive pinion 11.

These last two embodiments offer the advantage that, as already mentioned, a larger torque can be transmitted, so that they are particularly well suited for very heavy operations.

It will be obvious to those skilled in the art that many modifications may be made within the scope of the present invention without departing from the spirit thereof, and the invention includes all such modifications.

What is claimed is:

1. In a shock-proof bearing for a heavy drum which is rotatably supported on a roller and is adapted to be driven by a gear drive, the axial spacing between the drum and the roller or the gear drive remaining constant for every spring-support position, the improvement comprising that the roller and a driving pinion are integral, and spring support means mounted between a casing of the roller and a hub thereof, said spring support means being a plurality of semi-circular spring elements and a resilient insert.

2. In a shock-proof bearing for a heavy drum which is rotatably supported on a roller and is adapted to be driven by a gear drive, the axial spacing between the drum and the roller or the gear drive remaining constant for every spring-support position, the improvement comprising that the roller and a driving pinion are integral, and spring support means mounted between a casing of the roller and a hub thereof, said spring support means being a plurality of sheathed, spoke-like resilient inserts equidistantly mounted to the hub in a star-shaped configuration, sheathed support components positioned in the cavities of said resilient inserts and secured to the interior of the roller casing, and said sheathed resilient inserts being capable of radial displacement.

* * * * *